(12) United States Patent
Moss et al.

(10) Patent No.: US 11,481,342 B2
(45) Date of Patent: Oct. 25, 2022

(54) DATA STORAGE SYSTEM DATA ACCESS ARBITRATION

(71) Applicant: Seagate Technology LLC, Cupertino, CA (US)

(72) Inventors: Robert Wayne Moss, Windsor, CO (US); Michael Shaw, Colorado Springs, CO (US); Thomas V. Spencer, Fort Collins, CO (US); Yalan Liu, Longmont, CO (US); Sarvani Reddy Kolli, Longmont, CO (US)

(73) Assignee: SEAGATE TECHNOLOGY LLC

( * ) Notice: Subject to any disclaimer, the term of this patent is extended or adjusted under 35 U.S.C. 154(b) by 0 days.

(21) Appl. No.: 16/451,864

(22) Filed: Jun. 25, 2019

(65) Prior Publication Data

US 2020/0409874 A1 Dec. 31, 2020

(51) Int. Cl.
| | |
|---|---|
| *G06F 13/16* | (2006.01) |
| *G06F 9/50* | (2006.01) |
| *G06F 11/07* | (2006.01) |
| *G06F 12/02* | (2006.01) |
| *G06F 11/10* | (2006.01) |

(52) U.S. Cl.
CPC ........ *G06F 13/1605* (2013.01); *G06F 9/5016* (2013.01); *G06F 11/0703* (2013.01); *G06F 12/0238* (2013.01)

(58) Field of Classification Search
CPC .......... G06F 12/00; G06F 11/00; G01R 31/08
See application file for complete search history.

(56) References Cited

U.S. PATENT DOCUMENTS

| | | | |
|---|---|---|---|
| 5,388,245 A | 2/1995 | Wong | |
| 5,659,687 A | 8/1997 | Kim et al. | |
| 6,240,508 B1 | 5/2001 | Brown, III et al. | |
| 6,505,260 B2 | 1/2003 | Chin et al. | |
| 6,629,220 B1 * | 9/2003 | Dyer | G06F 13/1642 710/220 |
| 6,715,116 B2 | 3/2004 | Lester et al. | |
| 6,816,947 B1 | 11/2004 | Huffman | |
| 7,324,438 B1 * | 1/2008 | Savoldi | H04L 41/0631 370/216 |
| 8,082,404 B2 | 12/2011 | Jeddeloh et al. | |
| 8,713,264 B2 | 4/2014 | Henriksson et al. | |
| 8,793,421 B2 | 7/2014 | Miller et al. | |
| 8,954,689 B2 | 2/2015 | Seekins et al. | |
| 8,996,781 B2 | 3/2015 | Schuette et al. | |
| 9,317,204 B2 | 4/2016 | Hahn et al. | |
| 9,400,615 B2 | 7/2016 | McKean et al. | |
| 9,430,412 B2 | 8/2016 | Huang | |
| 9,525,737 B2 | 12/2016 | Friedman | |
| 9,626,309 B1 | 4/2017 | Burke et al. | |
| 10,296,475 B2 | 5/2019 | Benisty | |
| 10,310,745 B2 | 6/2019 | Wu et al. | |
| 10,310,995 B1 | 6/2019 | Malygin et al. | |

(Continued)

*Primary Examiner* — Getente A Yimer
(74) *Attorney, Agent, or Firm* — Hall Estill Law Firm

(57) ABSTRACT

A data storage system can organize a semiconductor memory into a first data set and a second data set with a first queue populated with a first data access request from a host. An assignment of an arbitration weight to the first queue with an arbitration circuit corresponds with the first queue being skipped during a deterministic window based on the arbitration weight.

19 Claims, 6 Drawing Sheets

(56) References Cited

U.S. PATENT DOCUMENTS

| | | | |
|---|---|---|---|
| 2003/0031171 A1* | 2/2003 | Van Wageningen | ........................ H04L 12/5602 370/360 |
| 2007/0174529 A1* | 7/2007 | Rodriguez | ............ G06F 13/362 710/240 |
| 2012/0036509 A1* | 2/2012 | Srinivasan | ............... G06F 9/526 718/102 |
| 2014/0032803 A1* | 1/2014 | Gupta | .................... G06F 13/364 710/113 |
| 2016/0026388 A1 | 1/2016 | Jeong et al. | |
| 2016/0188499 A1* | 6/2016 | Nagarajan | ........... G06F 13/1663 711/150 |
| 2016/0191420 A1* | 6/2016 | Nagarajan | ................ H04L 49/25 370/389 |
| 2017/0300263 A1 | 10/2017 | Helmick | |
| 2018/0307650 A1 | 10/2018 | Kachere et al. | |

* cited by examiner

DATA STORAGE SYSTEM DATA ACCESS ARBITRATION

SUMMARY

In accordance with some embodiments, a data storage system has a semiconductor memory organized into a first data set and a second data set with a first queue populated with a first data access request from a host. An assignment of an arbitration weight to the first queue with an arbitration circuit corresponds with the first queue being skipped during a deterministic window based on the arbitration weight.

A data storage system, in various embodiments, has a semiconductor memory organized into a first data set and a second data set with a first queue populated with a first data access request from a host. An execution parameter is predicted for of the first data access request with a prediction circuit that allows an arbitration weight to be assigned to the first queue, as directed by an arbitration circuit based on the predicted execution parameter. The assignment of the arbitration weight to the first queue corresponds with the first queue being skipped during a deterministic window based on the arbitration weight.

Other embodiments configure a data storage system with a non-volatile semiconductor memory organized into a first data set, a second data set, and a first queue. The first queue is populated with a first data access request and is connected to an arbitration circuit that is configured to generate a queue selection sequence in response to an arbitration weight generated by the arbitration circuit. The queue selection sequence causes the first queue to be skipped during a deterministic window.

DETAILED DESCRIPTION

Figure 1:
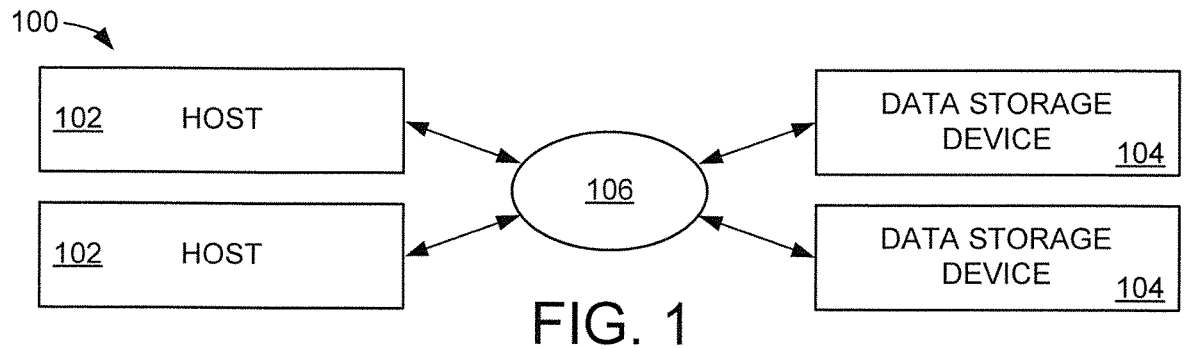
FIG. 1 provides a block representation of a data storage system in which various embodiments can be practiced.

Without limitation, the various embodiments disclosed herein are generally directed to optimized data access request arbitration for data assigned to different die set portions a data storage system.

By fairly arbitrating between data access requests based on the measure, or calculation, of one or more parameters of the constituent data allows for the mitigation of unwanted interactions between data sets and optimized data access rates. In data storage systems employing an NVMe (Non-Volatile Memory Express) standard, multiple queues can be utilized for data access requests with each request corresponding to an amount of data transferred between a host and a memory location. If a simple arbitration scheme is used to select which queued requests to execute, such as round robin or first in first out (FIFO), queues populated with requests having greater volumes of data will utilize more common system resources than queues populated with requests having smaller volumes of data. Such inequity amongst data access request queues can be problematic for consistent data access performance.

In some data storage systems, input/output (I/O) determinism can be employed. A goal of I/O determinism is to minimize the impact of operations between data sets of memory, particularly NVMe data sets. Although I/O determinism can provide control over the physical separation of storage media to avoid interactions, there are other shared, or otherwise common, controller resources that can also be optimized to provide additional isolation of command execution between data sets. However, the utilization of controller resources does not necessarily optimize data access consistency and can favor peak data access performance at the expense of queued data access request execution consistency.

Accordingly, various embodiments are configured to optimize queued data access request arbitration by organizing a semiconductor memory into a first die set and a second die set with a queue being populated with first and second data blocks from a host and having an arbitration weight assigned by an arbitration circuit so that the queue can be skipped during a deterministic window based on the arbitration weight. The ability to assign an arbitration weight to a data access request queue based on measured, and/or calculated, data access parameters allows for queue selection balancing and proactive data access request execution that increases the consistency of I/O deterministic operations.

In general, solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used.

Groups of dies may be arranged into die sets, which may correspond with the NVMe standard. This standard enables multiple owners (users) to access and control separate portions of a given SSD (or other memory device).

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs have a top-level controller circuit and a flash (or other semiconductor) memory module. A number of channels, or lanes, are provided to enable communications between the controller and dies within the flash memory. One example is an 8 lane/128 die configuration, with each lane connected to 16 dies. The dies are further subdivided into planes, GCUs, erasure blocks, pages, etc. Groups of dies may be arranged into separate NVMe sets, or namespaces. This allows the various NVMe sets to be concurrently serviced for different owners (users).

SSDs have a limited number of hold up energy after power loss that is tied to the number of capacitors. More capacitors are needed in order to keep a drive alive longer after power loss, minimizing the number of capacitors can increase system performance. On the other hand, limiting the amount of host and metadata that can be written after power loss can restrict the drive performance, since work will need to be denied until previously open work has completed. In contrast, the more metadata you can write on power loss improves the time to ready when the drive comes back up again, and less work needs to be done in order to fully reload the drive context.

These and other features may be practiced in a variety of differently configured data storage systems, but various embodiments conduct data access queue arbitration optimization in the example data storage system 100 shown as a simplified block representation in FIG. 1. The system 100 has a plurality of different hosts 102 connected to a plurality of different data storage devices 104 via a network 106. The assorted hosts 102 can be any remote computing device, such as a computer, server, circuit, node, or processor, capable of generating or transferring data to be stored in one or more data storage devices 104.

The respective data storage devices 104 may have similar, or dissimilar, configurations, and physical locations, that provide a non-volatile data storage capacity to the respective hosts 102 connected to the network 106. The network 106 can be any wired and/or wireless connection between hosts 102 and storage destinations. In some embodiments, the network 106 comprises circuitry allowing for the intelligent organization and distribution of data from one or more hosts 102 to one or more destination data storage devices 104.

Figure 2:
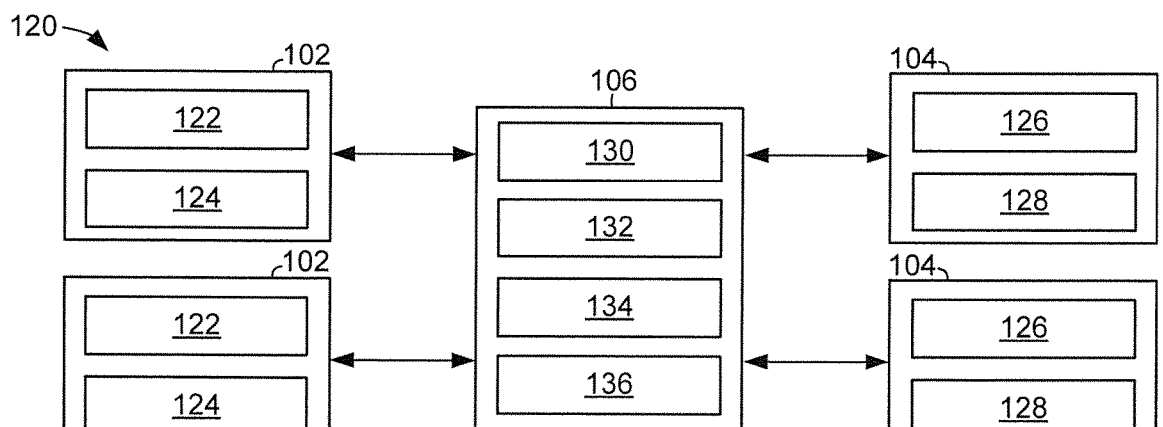
FIG. 2 displays portions of an example data storage system arranged in accordance with some embodiments.

FIG. 2 illustrates a block representation of an example data storage system 120 where the respective hosts 102 each have a local controller 122 and memory 124 that enables data to be transferred to the network 106. It is contemplated that the hosts 102 designate a data storage destination, such as a logical and/or physical address in the local memory 126 of one or more data storage devices 104, but such address assignment is not required. It is also contemplated that a local device controller 128 can participate in organizing and storing data in memory 126 that originated in a host 102.

While the network 106 may simply transfer data, and other data information, between a host 102 and at least one data storage device 104, various embodiments configure the network 106 with at least one network controller 130 that can utilize one or more network buffers 132 to temporarily, or permanently, store data. The network controller 130 may also utilize network arbitration circuitry 134 to organize and/or deploy data requests, and associated data, to/from the various data storage devices 104. A prediction circuit 136 may be selectively utilized by the network controller 130 to analyze data requests allocation, data request execution, data queue performance, data storage device performance, and other data storage system operational parameters to compute future data access request, and data access execution, metrics that can aid in the organization and deployment to provide heightened I/O determinism data access consistency to one or more hosts 102.

Figure 3:
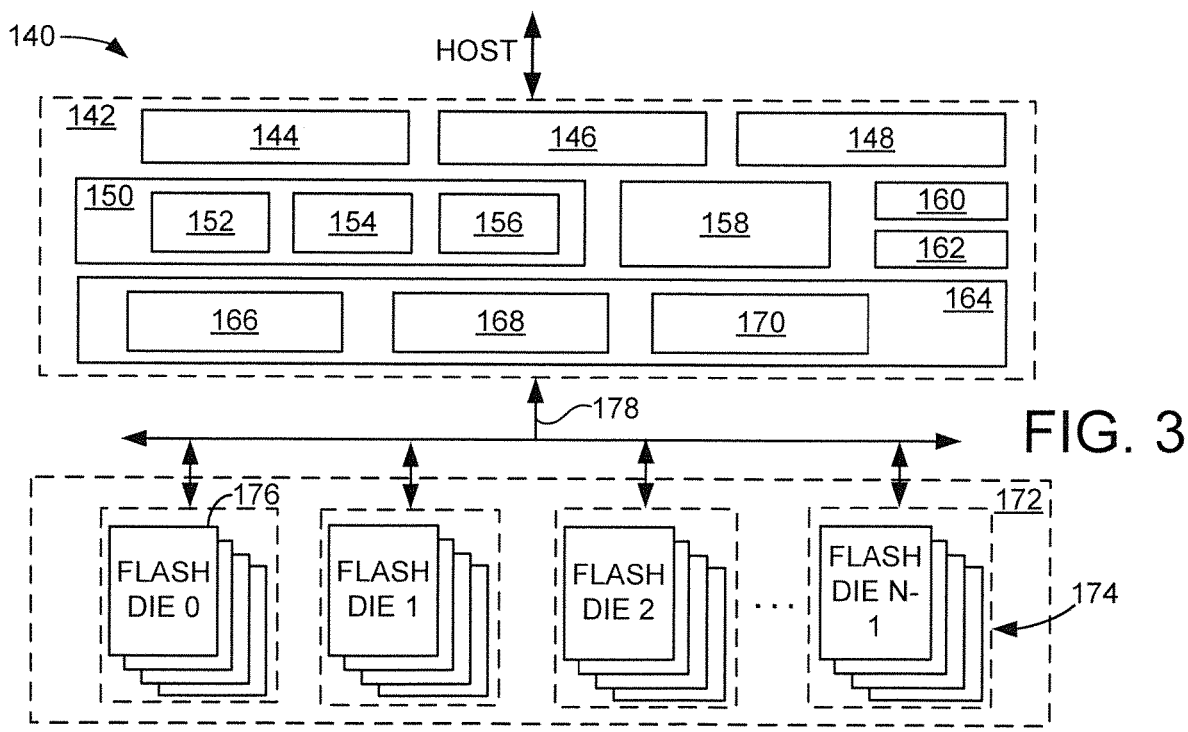
FIG. 3 shows aspects of an example data storage system configured in accordance with assorted embodiments.

FIG. 3 displays an example data storage device 140 generally corresponding to the device 104 in FIGS. 1 & 2. The device 140 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe standard, which enables different users to allocate die sets for use in the storage of data. Each die set may form a portion of a Namespace that may span multiple SSDs or be contained within a single SSD. The SSD 140 can comprise a controller circuit 142 with a front-end controller 144, a core controller 146 and a back-end controller 148. The front-end controller 144 performs host I/F functions, the back-end controller 148 directs data transfers with the memory module 144 and the core controller 146 provides top level control for the device.

Each controller 144, 146 and 148 has a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 150 represents various forms of volatile and/or non-volatile memory (e.g., SRAM, DDR DRAM, flash, etc.) utilized as local memory by the controller 142. Various data structures and data sets may be stored by the memory including one or more map structures 152, one or more caches 154 for map data and other control information, and one or more data buffers 156 for the temporary storage of host (user) data during data transfers.

A non-processor based hardware assist circuit 158 may enable the offloading of certain memory management tasks by one or more of the controllers as required. The hardware circuit 158 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 142, such as a data compression block 160 and an encryption block 162. The data compression block 160 applies lossless data compression to input data sets during write operations, and subsequently provides data de-compression during read operations. The encryption block 162 provides any number of cryptographic functions to input data including encryption, hashes, decompression, etc.

A device management module (DMM) 164 supports back end processing operations and may include an outer code engine circuit 166 to generate outer code, a device I/F logic circuit 168 and a low density parity check (LDPC) circuit 170 configured to generate LDPC codes as part of the error detection and correction strategy used to protect the data stored by the by the SSD 140.

A memory module 172 corresponds to the memory 126 in FIG. 2 and includes a non-volatile memory (NVM) in the form of a flash memory 174 distributed across a plural number N of flash memory dies 176. Rudimentary flash memory control electronics may be provisioned on each die 176 to facilitate parallel data transfer operations via one or more channels (lanes) 178.

Figure 4:
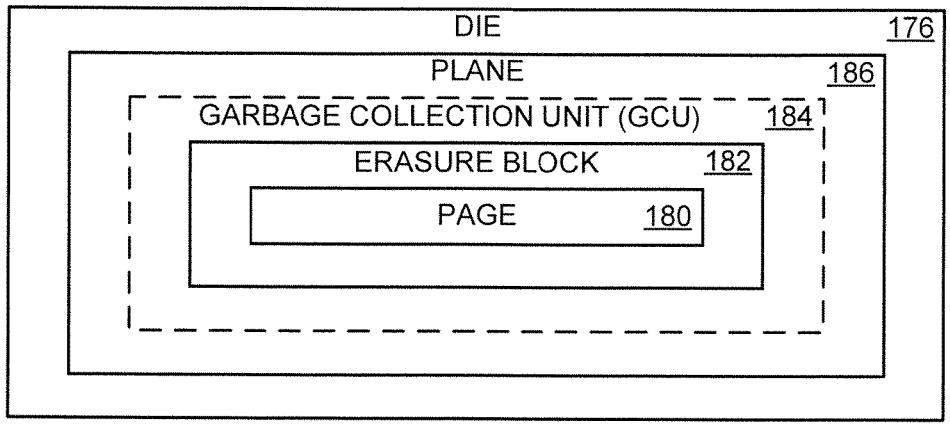
FIG. 4 is a block representation of an example memory capable of being used in the data storage system of FIGS. 1-3.

FIG. 4 shows an arrangement of a flash memory die 176 that can be used in the flash memory 174 of FIG. 3 in some embodiments. Other configurations can be used. The smallest unit of memory that can be accessed at a time is referred to as a page 180. A page may be formed using a number of flash memory cells that share a common word line. The storage size of a page can vary; current generation flash memory pages can store, in some cases, 16 KB (16,384 bytes) of user data.

The memory cells associated with a number of pages are integrated into an erasure block 182, which represents the smallest grouping of memory cells that can be concurrently erased in a NAND flash memory. A number of erasure blocks 182 are turn incorporated into a garbage collection unit (GCU) 184, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 176 may include a plurality of planes 186. Examples include two planes per die, four planes per die, etc. although other arrangements can be used. Generally, a plane is a subdivision of the die 176 arranged with separate read/write/erase circuitry such that a given type of access operation (such as a write operation, etc.) can be carried out simultaneously by each of the planes to a common page address within the respective planes.

Figure 5:
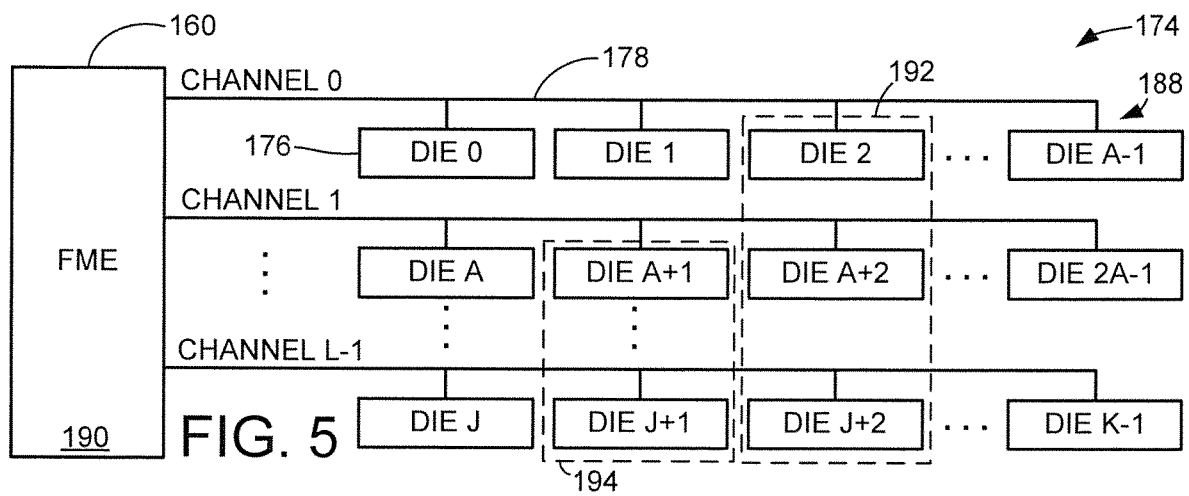
FIG. 5 illustrates portions of an example data storage system that can be utilized in the data storage system of FIGS. 1-3 in accordance with various embodiments.

FIG. 5 shows further aspects of the flash memory 174 in some embodiments. A total number K dies 176 are provided and arranged into physical die groups 188. Each die group 188 is connected to a separate channel 178 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 190 of the flash memory module 174 controls each of the channels 168 to transfer data to and from the dies 176.

In some embodiments, the various dies are arranged into one or more die sets. A die set represents a portion of the storage capacity of the SSD that is allocated for use by a particular host (user/owner). Die sets are usually established with a granularity at the die level, so that some percentage of the total available dies 176 will be allocated for incorporation into a given die set.

A first example die set is denoted at 192 in FIG. 5. This first set 192 uses a single die 176 from each of the different channels 178. This arrangement provides fast performance during the servicing of data transfer commands for the set since all eight channels 178 are used to transfer the associated data. A limitation with this approach is that if the set 192 is being serviced, no other die sets can be serviced during that time interval. While the set 192 only uses a single die from each channel, the set could also be configured to use multiple dies from each channel, such as 16 dies/channel, 32 dies/channel, etc.

A second example die set is denoted at 194 in FIG. 5. This set uses dies 176 from less than all of the available channels 178. This arrangement provides relatively slower overall performance during data transfers as compared to the set 192, since for a given size of data transfer, the data will be transferred using fewer channels. However, this arrangement advantageously allows the SSD to service multiple die sets at the same time, provided the sets do not share the same (e.g., an overlapping) channel 178.

It is noted that data may be stored to the flash memory module 174 as map units (MUs) that represent fixed sized blocks of data that are made up of one or more user logical block address units (LBAs) supplied by a host. Without limitation, LBAs may have a first nominal size, such as 512 bytes (B), 1024 B (1 KB), etc., and the MUs may have a second nominal size, such as 4096 B (4 KB), etc. The application of data compression may cause each MU to have a smaller size in terms of actual bits written to the flash memory 174.

MUs can be arranged into the aforementioned pages 180, as shown in FIG. 4, which are written to the memory 174. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks to enable the SSD 140 to locate the physical location of existing data. For example, during the servicing of a read command it is generally necessary to locate the physical address within the flash memory 176 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
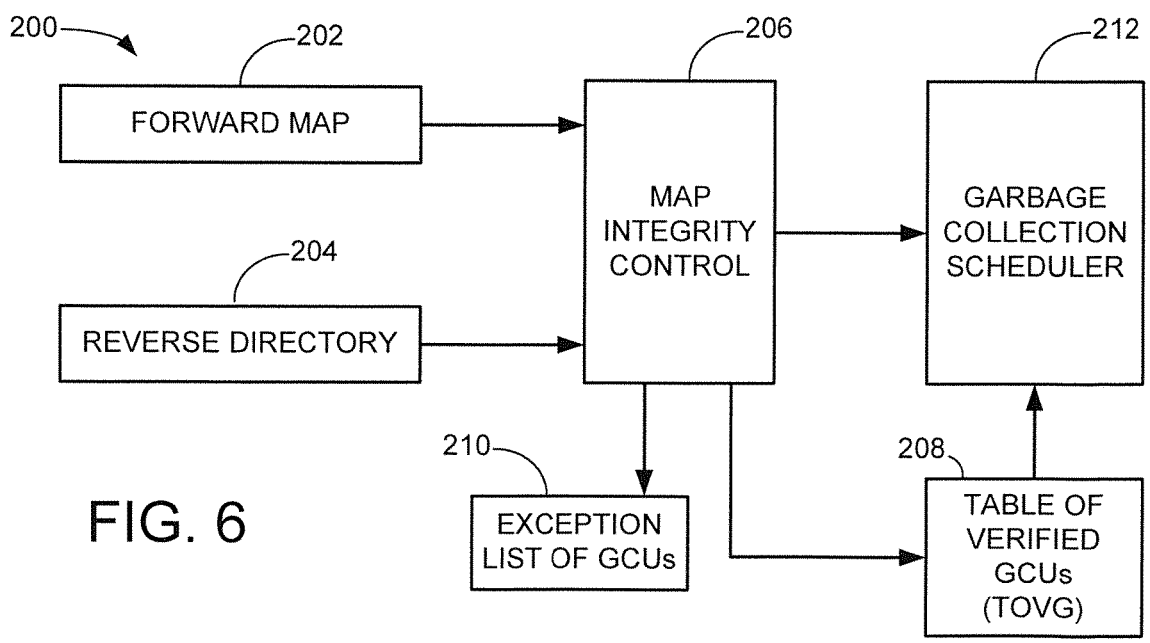
FIG. 6 depicts a functional block diagram for a data storage system operated in accordance with some embodiments.

FIG. 6 shows a functional block diagram for a data storage device management circuit 200 that can be utilized in accordance with some embodiments. The circuit 200 may form a portion of the controller 142 and may be realized using hardware circuitry and/or one or more programmable processor circuits with associated firmware in memory. The circuit 200 includes the use of a forward map 202 and a reverse directory 204. As noted above, the forward map and reverse directory are metadata data structures that describe the locations of the data blocks in the flash memory 172. During the servicing of host data transfer operations, as well as other operations, the respective portions of these data structures are located in the flash memory or other non-volatile memory location and copied to local memory 126 (see e.g., FIG. 2).

The forward map 202 provides a flash transition layer (FTL) to generally provide a correlation between the logical addresses of various blocks and the physical addresses at which the various blocks are stored (e.g., die set, die, plane, GCU, EB, page, bit offset, etc.). The contents of the forward map 202 may be stored in specially configured and designated GCUs in each die set.

The reverse directory 204 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 200 further includes a map integrity control circuit 206. That generally operates at selected times to recall and compare, for a given GCU, the forward map data and the reverse directory data. This evaluation step includes processing to determine if both metadata structures indicate the same number and identify of the valid data blocks in the GCU. If the respective forward map and reverse directory match, the GCU is added to a list of verified GCUs in a data structure referred to as a table of verified GCUs, or TOVG 208. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 206 find a mismatch between the forward map 202 and the reverse directory 204 for a given GCU, the control circuit 206 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 202 indicates that there should be some number X valid blocks in the selected GCU, such as 12 valid blocks, but the reverse directory 204 indicates that there are only Y valid blocks, such as 11 valid blocks, and the 11 valid blocks indicated by the reverse directory 204 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 210 may be formed as a data structure in memory of GCUs that have been found to require further evaluation. In this way, the GCUs can be evaluated later at an appropriate time for resolution, after which the corrected GCUs can be placed on the verified list in the TOVG 208.

It will be noted that the foregoing operation of the control circuit 206 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the management circuit 200 having a garbage collection scheduler circuit 212. This circuit 212 generally operates once it is appropriate to consider performing a garbage collection operation, at which point the circuit 212 selects from among the available verified GCUs from the table 208. In some cases, the circuit 212 may generate a time of completion estimate to complete the garbage collection operation based on the size of the GCU, the amount of data to be relocated, etc.

As will be appreciated, a garbage collection operation can include accessing the forward map and/or reverse directory 202, 204 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
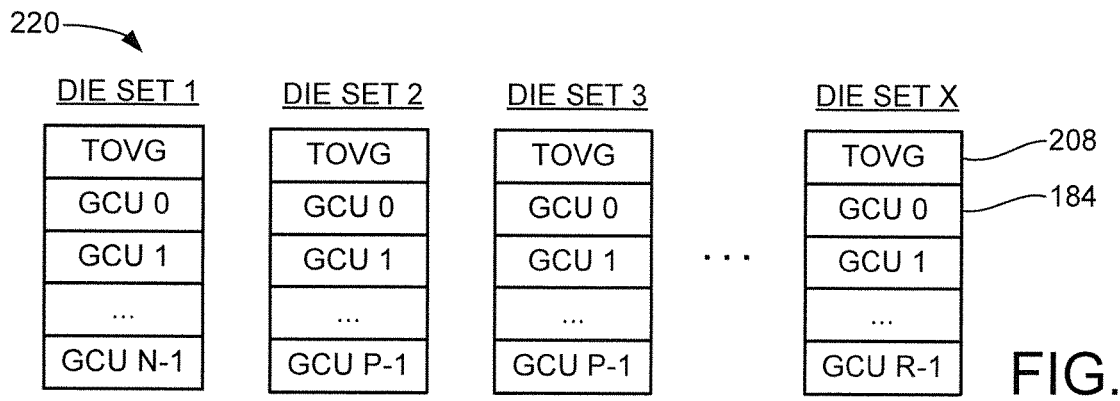
FIG. 7 conveys portions of an example data storage system arranged in accordance with assorted embodiments.

FIG. 7 shows a number of die sets 220 that may be arranged across the SSD 140 in some embodiments. Each set 220 may have the same nominal data storage capacity (e.g., the same number of allocated dies, etc.), or each may have a different storage capacity. The storage capacity of each die set 220 is arranged into a number of GCUs 184 as shown. In addition, a separate TOVG (table of verified GCUs) 208 may be maintained by and in each die set 200 to show the status of the respective GCUs. From this, each time that it becomes desirable to schedule a garbage collection operation, such as to free up new available memory for a given set, the table 208 can be consulted to select a GCU that, with a high degree of probability, can be subjected to an efficient garbage collection operation without any unexpected delays due to mismatches in the metadata (forward map and reverse directory).

Figure 8:
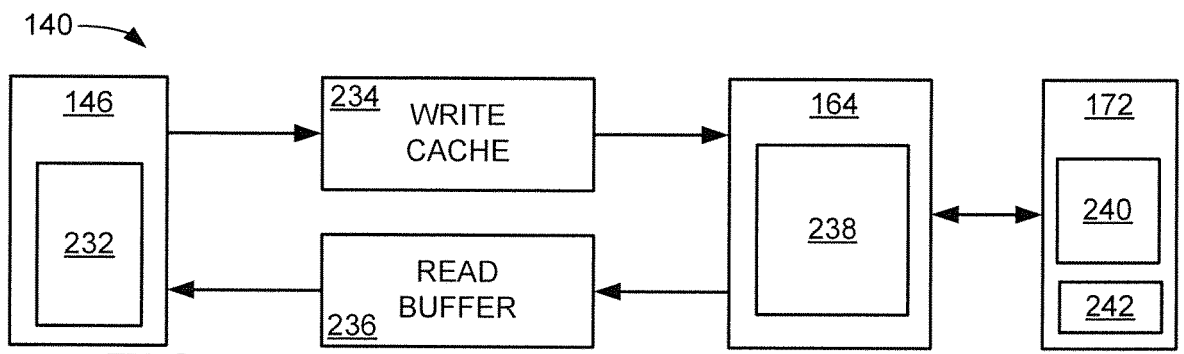
FIG. 8 illustrates portions of an example data storage system that may be employed in accordance with various embodiments.

FIG. 8 shows a functional block representation of additional aspects of the SSD 140. The core CPU 146 from FIG. 3 is shown in conjunction with a code management engine (CME) 232 that can be used to manage the generation of the respective code words and outer code parity values for both standard and non-standard parity data sets. During write operations, input write data from the associated host are received and processed to form MUs which are placed into a non-volatile write cache 234 which may be flash memory or other form(s) of non-volatile memory. The MUs are transferred to the DMM circuit 164 for writing to the flash memory 152 in the form of code words. During read operations, one or more pages of data are retrieved to a volatile read buffer 236 for processing prior to transfer to the host.

The CME 232 determines the appropriate inner and outer code rates for the data generated and stored to memory. In some embodiments, the DMM circuit 164 may generate both the inner and outer codes. In other embodiments, the DMM circuit 164 generates the inner codes (see e.g., LDPC circuit 170 in FIG. 3) and the core CPU 146 generates the outer code words. In still other embodiments, the same processor/controller circuit generates both forms of code words. Other arrangements can be used as well. The CME 232 establishes appropriate code rates for both types of code words.

During generation of the outer codes, a parity buffer 238 may be used to successively XOR each payload being written during each pass through the dies. Both payload data 240 and map data 242 will be stored to flash 172. The execution of data access requests to store data to, or read data from, one or more flash memories 172 of one or more data storage devices 104 can be facilitated with multiple queues arranged in accordance with the NVMe standard.

Figure 9:
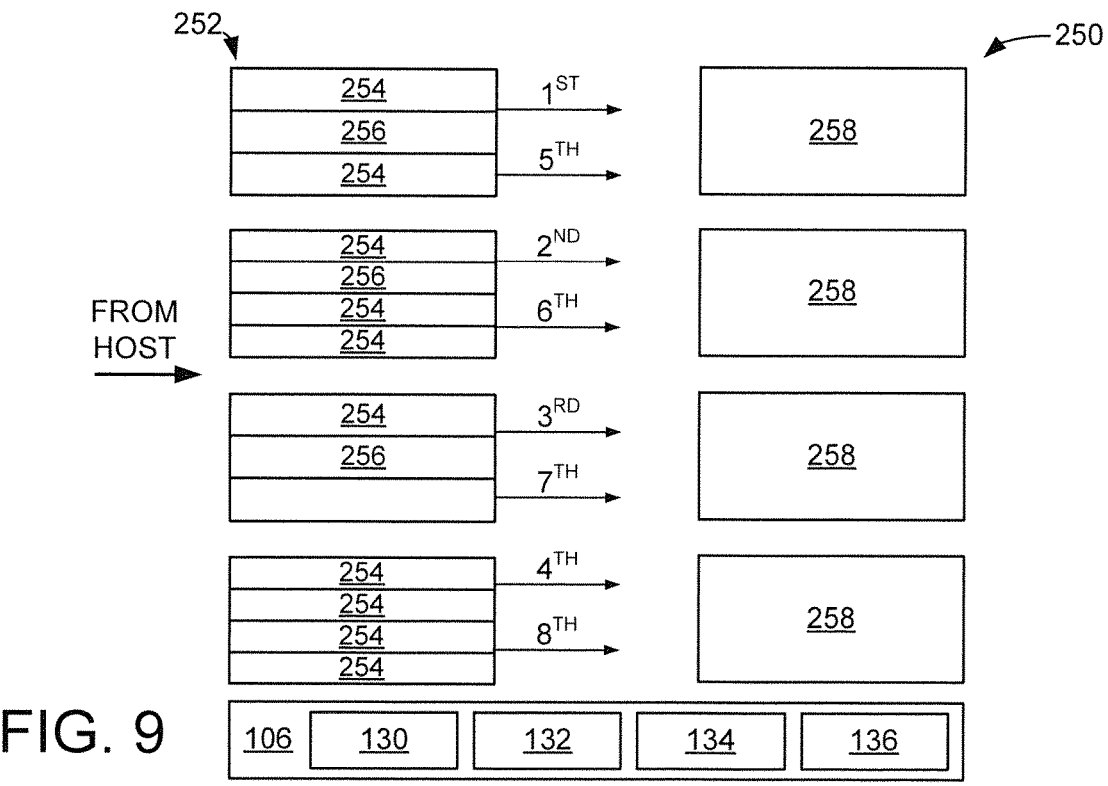
FIG. 9 is a block representation of portions of an example data storage system in which various embodiments may be practiced.

FIG. 9 conveys a block representation of portions of an example data storage system 250 in which data request queues 252 are employed in accordance with various embodiments. It is initially noted that the various data request queues 252 can store a request 254, and data block 256 associated with the stored requests 254, can be located in a data storage device 104 and/or a network device, such as device 106 that has a network controller 130 and memory 132. The ability to create and utilize data request queues 252 at the network 106 and/or local data storage device 104 level allows for a diverse range of request 254, and request data 256, queuing capabilities and configurations that can be catered to the data storage arrangement and data request history to optimize operations to achieve desired data access performance.

One such data storage queuing arrangement has the respective data requests 254, and/or data 256, assigned a destination address in at least one data set 258 of a non-volatile memory 126 while being temporarily stored in the queues 252 of one or more network buffers 132. The network buffer(s) 132 can be connected to a network controller 130 that can selectively employ arbitration 134 and/or prediction 136 circuitry for any stored request 254 and/or request data 256.

The network controller 130 alone, or in cooperation with one or more local memory controllers 128, can select an order of data request 254 execution with the arbitration circuitry 134 that corresponds with a round robin sequence. As shown by numbered arrows from the respective queues 252, the arbitration circuitry 134 can consecutively, and cyclically, execute a data request 254 stored in a different queue 252. Accordingly, each queue 252 has a pending request 254 executed to store data to, or retrieve data from, a selected data set 258 prior to repeating the execution of a request 252 from a single queue 252.

Figure 10:
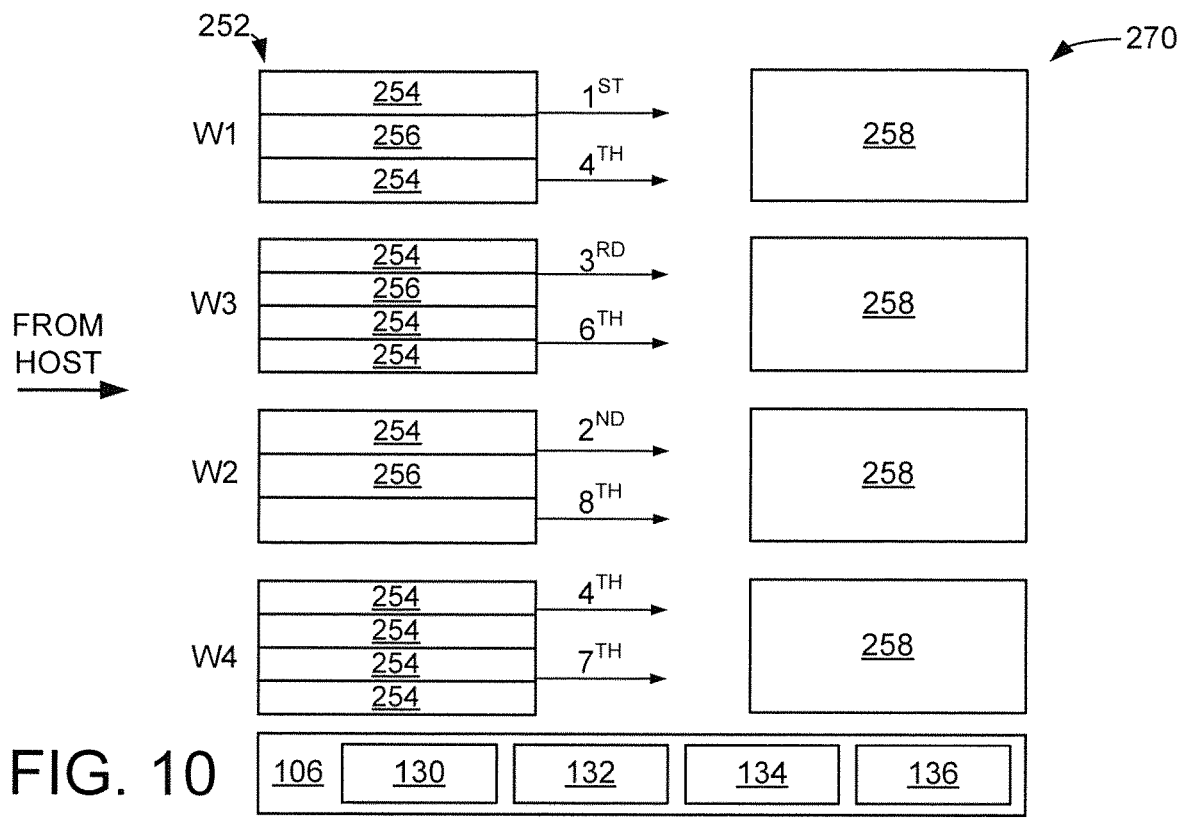
FIG. 10 represents portions of an example data storage system configured in accordance with various embodiments.

Through the round robin arbitration of pending data requests 254, the size of data 256 being transferred and the time involved with execution of the requests 254 can vary to a relatively high degree, which results in inconsistent system 250 resource utilization and data request execution. FIG. 10 illustrates portions of an example data storage system 270 that are organized similarly to the system 250 of FIG. 9, but utilizes a weighted round robin request arbitration scheme, as conveyed by numbered arrows that indicate the order of request 254 execution from the various queues 252.

Instead of simply executing a request 254 from sequential queues 252, as provided in FIG. 9, the weighted round robin scheme of FIG. 10 utilizes one or more criteria to determine which queue 252 will have a request 254 selected for execution. The criteria providing weight is not limited to a particular type of information about the pending data 256, queue 252, or destination data set 258. As such, the arbitration circuitry 134 can generate, compile, and/or compute one or more informational parameters about the queues 252, requests 254, data 256, or data sets 258 that can be used to increase the consistency of data request 254 execution performance.

The use of one or more parameters to give weight to a round robin queue 252 selection sequence can temporarily increase data storage consistency and/or performance. However, the relatively quick changes in the type, size, and destinations of requests 254, and data 256, stored in a queue 252 can pose operational difficulties, like draining system resources and increasing pending request 254 execution times. Thus, various embodiments are directed to utilizing the arbitration circuitry to provide both short and long-term optimization of pending data storage request 254 execution.

Figure 11:
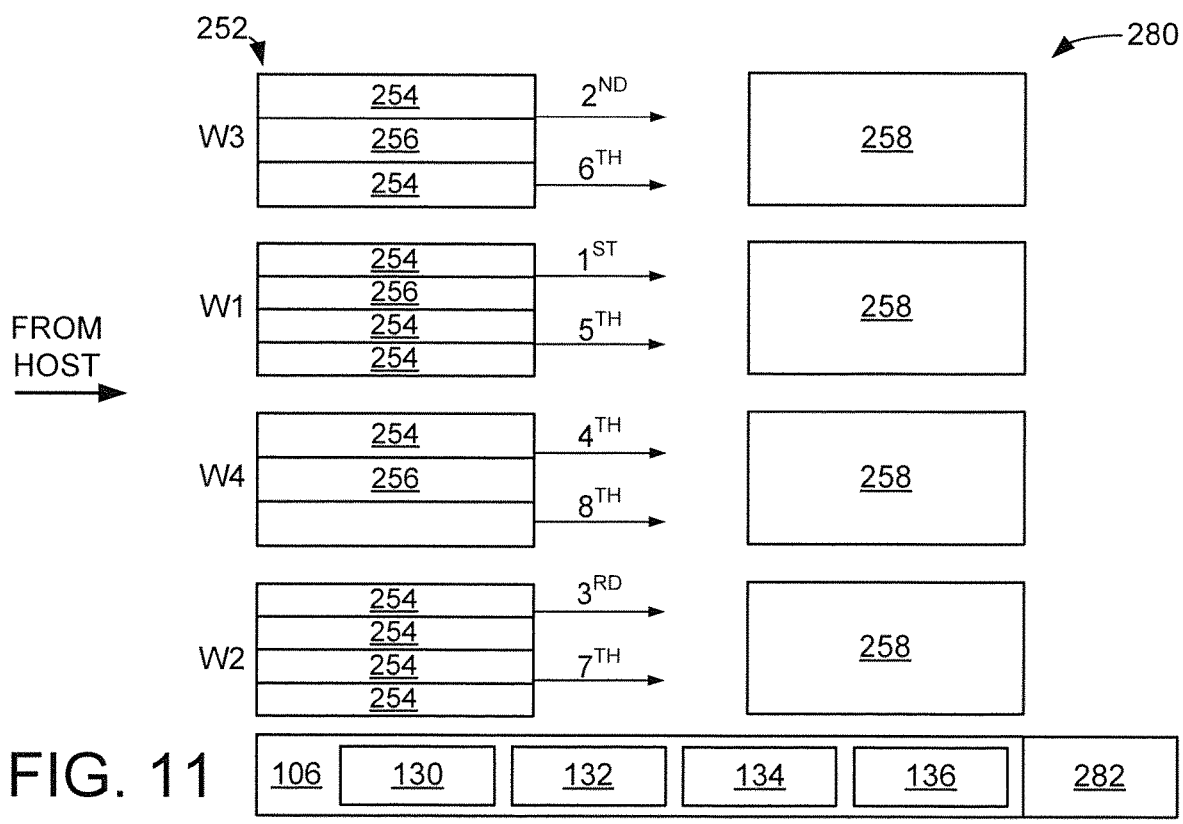
FIG. 11 displays portions of an example data storage system that can be utilized by assorted embodiments.

FIG. 11 displays a block representation of portions of an example data storage system 280 in which some embodiments utilize the arbitration circuitry 134 to optimize queue 252 selection and data request 254 execution. Although not required or limiting, the arbitration circuitry 134 can consult one or more logs 282 of past system 280 operational data compiled by the network controller 130 and/or local memory controller(s) 128 to make intelligent queue 252 and data request 254 selection decisions. A log 282 can track any number, and type, of operational parameters, such as number of requests executed per queue 252, average time per queue request execution, average size per queue request, and error rate per queue request execution.

With the compiled log 282 of previous operational data for the system 280, the arbitration circuitry 134 can evolve queue weighting criteria in real-time as the queues 252 change with the execution, or eviction, of data requests 254. The log 282 of compiled operational data may further be utilized by the arbitration circuitry 134 to assign a temporary queue selection sequence, as denoted by W1-W4. The resulting execution of queued data requests 254 take into account the current operational performance of the system 280 in an effort to balance the data storage, and retrieval, performance involved with executing pending data access requests 254 from one or more remote hosts to provide increased request 254 execution consistency (speed, time, latency), even if such consistency is chosen instead of peak request performance (speed, time, error rate).

In some embodiments, the arbitration circuitry 134 can employ the prediction circuitry 136 to forecast one or more execution parameters pertaining to the selection and completion of one or more pending data access requests 254. It is contemplated that the prediction circuitry 136 forecasts the number, source, size, time to complete, and/or destination of one or more future, not currently pending, data access requests. The prediction circuitry 136 may utilize one or more algorithms, models, or schedules stored in the data storage system 280, such as in a network buffer 132, to predict future data access requests and request execution parameters.

The ability to predict the operational impact of executing pending data access requests 254 as well as predict how queues may change with new requests 254 allows the network controller 130 and arbitration circuitry 134 to intelligently, and proactively, select queues 252, and constituent pending data access requests 254, to provide consistent request execution metrics, such as time to completion and latency. The non-limiting example shown by system 280 conveys how the arbitration circuitry 134 can generate an arbitration weight that corresponds with a queue order (W1-W4) that matches the selection sequence for pending data access requests 254, as shown by numbered arrows. The arbitration weight may consist of one or more current, or predicted, execution parameters, such as error rate, average request size, or average request time to completion, to provide optimal balanced queue 252 selection and request 254 execution.

With the capability to analyze current, and predicted, data access requests 254 with respect to current, and predicted, system 280 operational conditions, the arbitration weight, and queue 252 selection sequence, can be altered over time to provide real time optimal request 254 execution that results in a balance of pending data access requests 254 in one or more queues 252 that have similar times to completion. The intelligent arbitration weight, in some embodiments, can be utilized to conduct current queue 252 selection sequencing to provide optimized future deterministic window request execution.

Figure 12A:
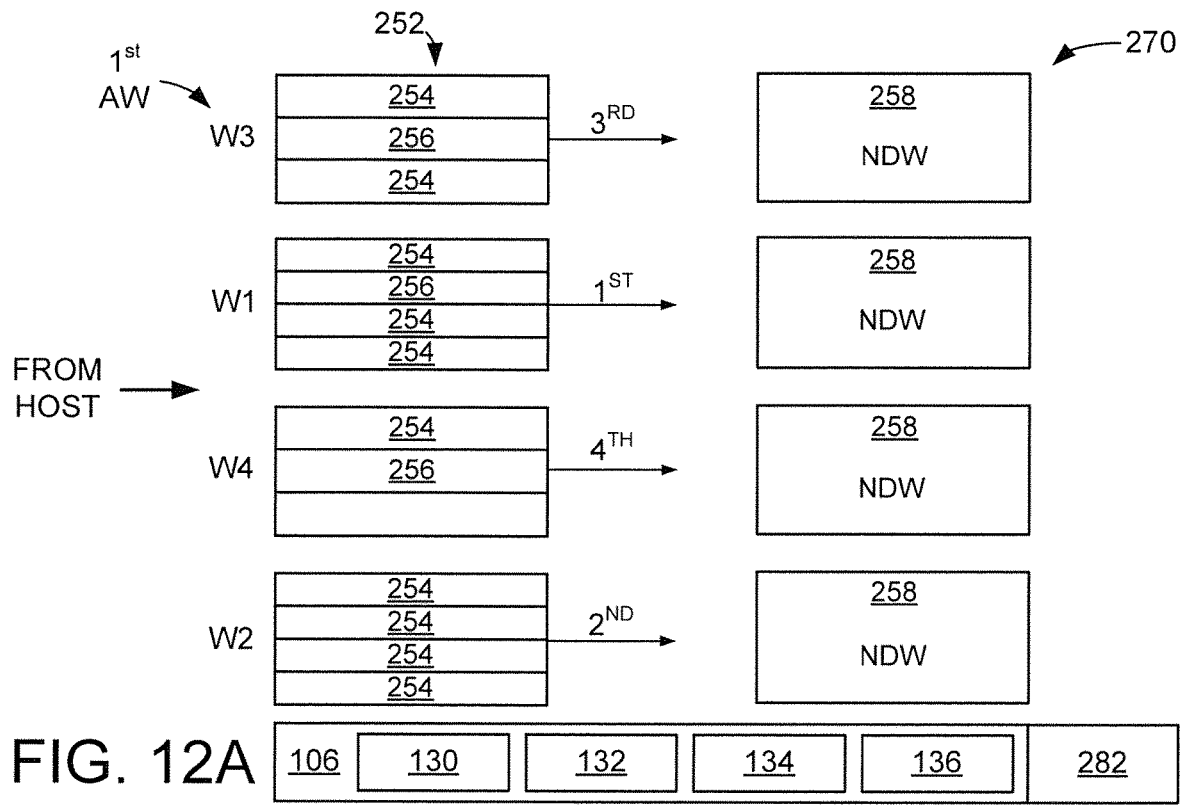
FIGS. 12A and 12B respectively show portions of an example data storage system configured in accordance with some embodiments.

FIG. 12A illustrates portions of an example data storage system 290 organized and operated in accordance with various embodiments to provide optimized deterministic window operation. As shown, the arbitration circuitry 134 can provide a first arbitration weight ($1^{st}$ AW) that corresponds with a first queue sequence 292 and execution of requests 254 in a particular order, as conveyed by numbered solid arrows.

The first arbitration weight can be based on detected and/or predicted execution parameters of the system 290 and may involve the prediction of future data access requests 254 to reduce request execution variance among one or more queues 252. That is, the arbitration circuitry 134 can generate the first queue sequence 292, and the first arbitration weight, to optimize pending request 254 time to completion consistency, which may result in high current request completion times, latency, and/or errors. Such first arbitration weight and queue sequence 292 may additionally result in current, and future, less-than-peak request 254 execution performance in order to provide future availability for optimized deterministic window data read performance, as shown in FIG. 12.

Figure 12B:
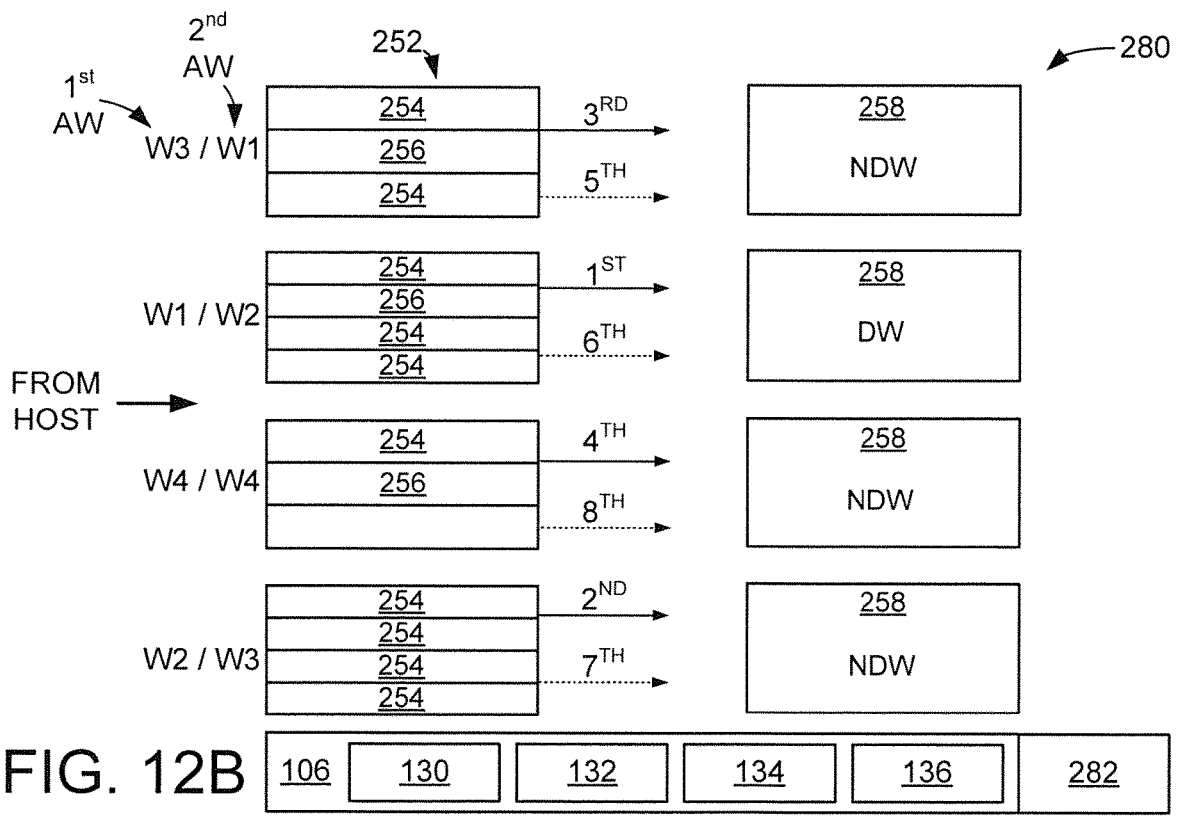

In the non-limiting example of FIG. 12B, the network controller 130 initially executes data access requests 254 in the first sequence 292 to optimize execution balancing among pending requests 254 then switches to a second queue sequence 294 in response to entering a deterministic window (DW). The second queue sequence 294 corresponds with a different request 254 execution order, as shown by numbered segmented lines. It is contemplated that the arbitration circuitry 134 reactively, or proactively, generates a second arbitration weight for the respective queues 252 for the deterministic window, such as in response to a request for the deterministic interval from a host.

While not required, the deterministic window causes the network controller 130 to prioritize data read request completion consistency, which is factored into the second arbitration weight and sequence 294. The second queue sequence 294 may, in some embodiments, prioritize data read request completion consistency by skipping one or more queues 252 or servicing requests to one or more data sets 258 in a non-deterministic window (NDW).

In other embodiments, newly received data access requests, or changing system 290 operational conditions during the deterministic window, cause the arbitration circuitry 134 can generate new arbitration weights and/or queue sequences that maintain a data read performance from the data set(s) 258 in a deterministic window. Such data read performance may be maintained within a predetermined performance range, such as a minimum, and/or maximum, request latency, request execution time, or request error rate.

Through the proactive balancing of queued data access requests 254 and the adaptive capability of the arbitration circuitry 134, I/O deterministic activities can be optimized for consistency without drastically altering the queues or system resources prior to entering a deterministic window. As such, the system 290 can have a greater acceptance rate for deterministic window requests from hosts than a system that reactively prepares for a deterministic window, such as by accelerating, altering, moving, or delaying queued data access requests.

Figure 13:
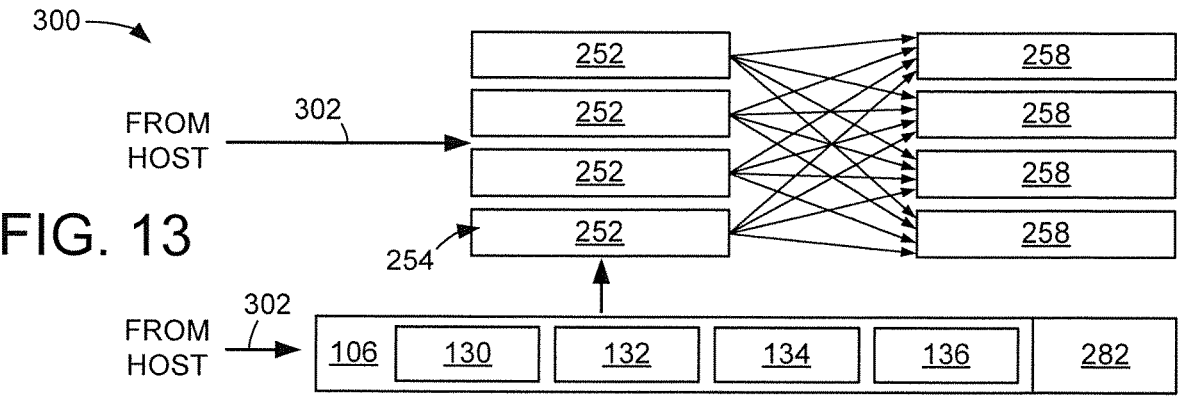
FIG. 13 provides a block representation of portions of an example data storage system in which assorted embodiments can be practiced.

The ability to balance populated data request queues 252 can provide heightened deterministic window consistency and performance. However, the proactive balancing operations can consume valuable system 290 time and resources. Hence, various embodiments utilize the arbitration circuitry 134 to intelligently populate one or more queues 252 prior to any proactive request 254 balancing operations. FIG. 13 depicts portions of an example data storage system 300 that conducts intelligent queue population in accordance with assorted embodiments. As data access requests 302 are received by the network controller 130 from one or more remote hosts, the arbitration circuitry 134 can select a queue 252 that best provides future capability to provide consistent deterministic window data access times.

The arbitration circuitry 134 can analyze incoming data access requests 302 for one or more operational parameters, such as size or intended destination, prior to assigning a queue 252. An incoming data access request 302 may be temporarily stored in a first memory, such as a relatively fast volatile memory, while the network controller 130, arbitration circuitry 134, and prediction circuitry 136 determine what queue 252 provides the best fit for the request 302 for future deterministic window conditions. The prediction circuitry 136 can forecast one or more execution parameters for the data access request 302 that may factor in yet to be received data access request.

For instance, the arbitration circuitry 134 can evaluate an incoming data access request 302 for size and destination while the prediction circuitry 136 forecasts how long the request 302 will take to execute in current, and/or predicted future, system 300 conditions, such as based on current and/or predicted queue volume along with the average execution times for past requests 254 executed from a queue 252, to assign a the request 302 to the proper queue 252 that provides the best availability for the system 300 to service deterministic window periods. It is noted that the assignment of a queue 252 for an incoming data access request 302 can degrade short-term, and/or long-term, data access performance, such as lower than peak data read or data write times, to provide heightened data access request execution consistency, such as less than 1% variance in access request latency and/or completion times.

In accordance with some embodiments, the system 300 may conduct data access request arbitration before and after being assigned to a queue 252. As previously discussed, arbitration of a destination queue 252 can be followed by arbitration of which queue 252 to select and execute a pending data access request 254. Such dual arbitration may be accomplished with a single arbitration circuit 134, or multiple separate circuits. Similarly, a single prediction circuit 136 can be employed or can be used in combination with other separate prediction means. Regardless of the circuit configuration of the system 300, the ability to conduct intelligent arbitration of incoming data access requests 302 can complement the intelligent selection of populated queues 252 to efficiently provide a balanced collective of queues 252 arranged to provide optimally consistent deterministic window data read request execution.

Figure 14:
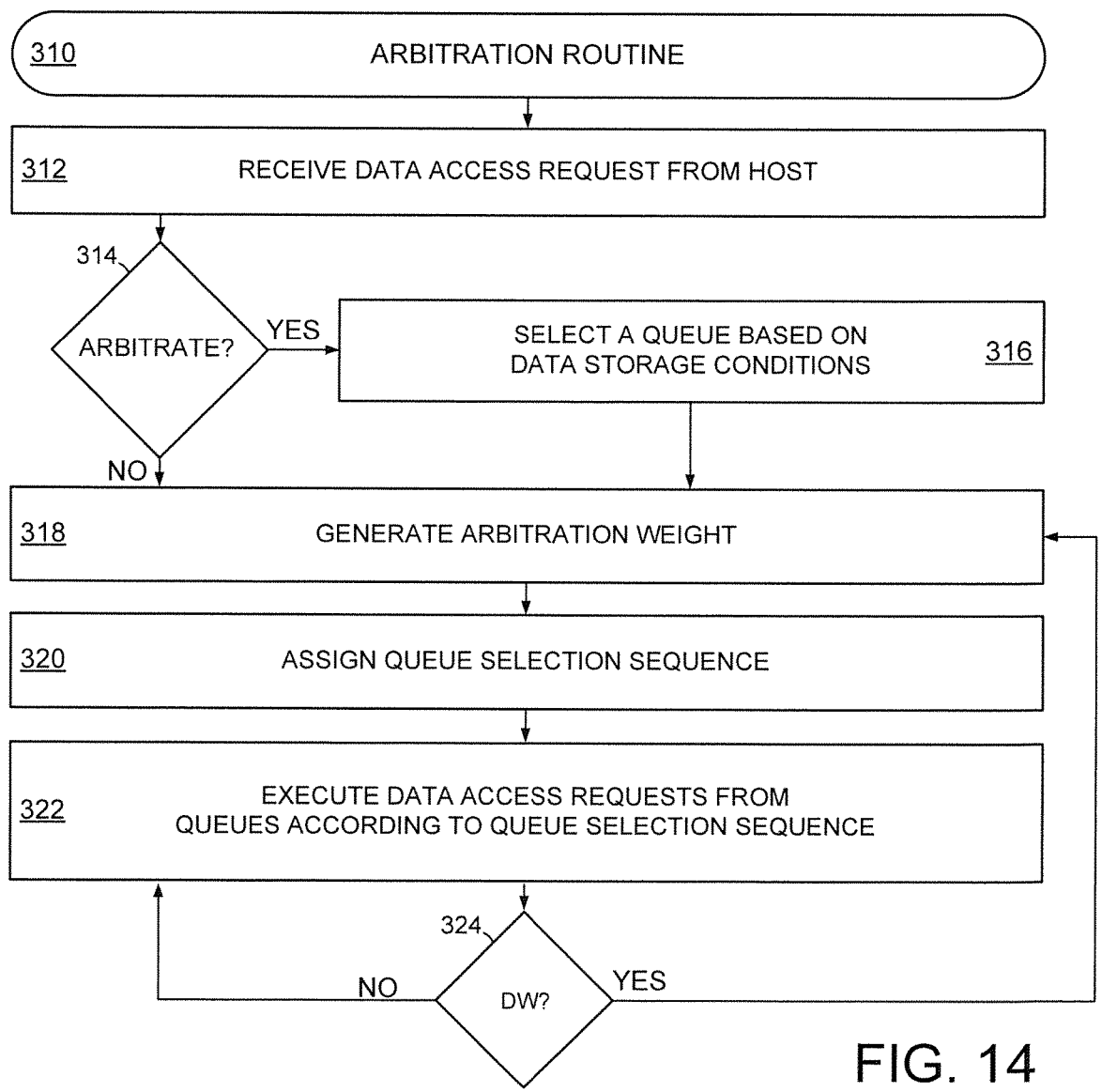
FIG. 14 is an example arbitration routine that can be executed by the respective embodiments of FIGS. 1-13.

FIG. 14 is a flowchart of an example arbitration routine 310 that can be carried out with the assorted embodiments of FIGS. 1-13. The routine 310 can begin with step 312 receiving one or more data access requests from at least one remote host. The data access requests may be data reads, data writes, or data maintenance operations, such as garbage collection, memory refresh, or I/O determinism commands. Receipt of a data access request prompts decision 314 to evaluate if arbitration is to be undertaken. If so, step 316 utilizes an arbitration circuit to intelligently select a queue for the data access request to provide heightened balance between queues and increased ability to service future deterministic window opportunities.

It is noted that step 316 may intelligently select a queue based on current, or future, data storage system conditions, such as average data request execution time, latency, and error rate for the respective queues. Such future data storage system conditions can be generated by a prediction circuit and may involve one or more logs of system activity compiled by a network controller. Once the data access request(s) have populated the assigned queue(s), or if no request arbitration is conducted in decision 314, step 318 proceeds to generate arbitration weights for the respective populated queues with an arbitration circuit based on current and/or future operational parameters associated with the servicing of the pending data access requests.

The arbitration weights can be specific for the respective queues and indicate where queues are to be selected in the queue selection sequence assigned by the arbitration circuitry in step 320. The arbitration weights, and resulting queue selection sequence, can be created in order to balance the request content of the various queues so that each queue has similar average request size and execution times. In some embodiments, the arbitration weights and queue selection sequence are created to balance the profile of data access requests, regardless of queue location, which can prioritize the large, slow, or error-prone requests to provide similar execution parameters among the collective pending requests.

The generated queue selection sequence is then executed in step 322 as one or more data access requests from the queue are serviced in the prescribed order of the queues according to the arbitration weight. It is noted that the particular data access request being executed in a queue may be in any selection scheme, such as first-in first-out (FIFO), largest first, slowest first, fastest first, or smallest first. The queue selection sequence can be cyclically repeated any number of times to service the various data access requests.

However, it is contemplated that new arbitration weights can be generated by returning to step 318, which may result in an altered queue selection sequence. The routine 310 can return to step 318 for any reason, such as detected system operational parameter changes, changes in data access request volume, or execution of one or more memory maintenance operations. The queue selection sequence may, alternatively, be altered in preparation of entering a deterministic window for one or more data sets. Decision 324 evaluates if a deterministic window is eminent. If so, new deterministic window queue arbitration weights and queue selection sequences are respectively generated, assigned, and executed in steps 318, 320, and 322.

The ability to adapt the arbitration weights and queue selection sequence at will allows for proactive and reactive balancing of data requests overall and/or between different queues so that a deterministic window can be efficiently started and completed with minimal variance in data read performance from a selected data set. For instance, a deterministic window can be more quickly accepted, entered into, and performed due to the proactive prioritizing of certain queues in accordance with the generated arbitration weights.

Overall, there are multiple arbitration algorithms that can be utilized by the arbitration routine 310 to achieve fairness. One example is employing the arbitration weights from step 318 to conduct a weighted round robin sequence. It is noted that the arbitration weights can correspond to one or more system, queue, and/or request operational parameters to provide queue arbitration rate shaping. An a priori predictive calculation can be used to generate a queue selection sequence. Such predictive calculation can pull a pending data access request from a queue and predict the amount of data and the amount of time that will be associated with executing the request. A running average of effective data requests for a queue can be used to generate the arbitration weight so that lower effective average data requests can be serviced more frequently.

The arbitration weights may alternatively be generated from logged average effective data request operational data (time, size, destination, source) on a per-queue basis as data is actually transferred to various data sets. The logging of data request execution may involve tracking a data request, but may occupy less processing than predicting the operational data associated with a request. It is contemplated that an arbitration weight can be generated based on other criteria, such as the number of memory operations, such as garbage collections, that are scheduled per queue. Regardless of how the arbitration weight is generated a fair arbitration of data access requests is accomplished that minimizes the impact of servicing a data access request from one queue to another.

Through the various embodiments of data storage system arbitration, proactive and reactive operations can intelligently be conducted to balance pending data access operations. The ability to arbitrate data access requests into queues and arbitrate queues for servicing of pending data access requests allows for optimal data access request pendency and location so that queue-to-queue performance variations are minimized. Furthermore, the intelligent arbitration of queues allows a deterministic window to be more efficiently conducted without having to first alter any requests and/or queues.

What is claimed is:

1. A method comprising:
organizing a semiconductor memory into a first data set and a second data set;
populating a first queue with a first data access request from a host;
assigning a first arbitration weight to the first queue with an arbitration circuit based on a predicted time to completion for the first data access request, the first arbitration weight prioritizes data access speed over data access execution consistency;
altering the first arbitration weight to a second arbitration weight with the arbitration circuit based on a detected change in the first queue, the second arbitration weight prioritizes data access execution consistency over data access speed to the semiconductor memory; and
skipping the first queue during a deterministic window based on the arbitration weight.

2. The method of claim 1, wherein the deterministic window is conducted on the first data set while the second data set is in a non-deterministic window.

3. The method of claim 1, wherein the arbitration circuit assigns a first queue selection sequence in response to the first arbitration weight.

4. The method of claim 3, wherein the first queue selection sequence is an order of executing data access requests from the first queue and at least one other queue.

5. The method of claim 3, wherein the arbitration circuit assigns a second queue selection sequence in response to the deterministic window ending.

6. The method of claim 5, wherein the second queue selection sequence involves executing the first data access request.

7. The method of claim 1, wherein the first arbitration weight is generated based on at least one logged operational parameter of the first queue.

8. The method of claim 1, wherein the first arbitration weight is generated based on averaged logged operational parameters of servicing a second data access request and a third data access request.

9. The method of claim 1, wherein the first data access request is assigned to the first queue by an arbitration circuit to decrease operational variance during the deterministic window.

10. A method comprising:
organizing a semiconductor memory into a first data set and a second data set;
populating a first queue with a first data access request from a host;
predicting an error rate of the first data access request with a prediction circuit;
assigning a first arbitration weight to the first queue with an arbitration circuit based on the predicted error rate execution parameter, the first arbitration weight prioritizes data access speed over data access execution consistency;
altering the first arbitration weight to a second arbitration weight with the arbitration circuit based on a detected change in the first queue, the second arbitration weight prioritizes data access execution consistency over data access speed to the semiconductor memory; and
skipping the first queue during a deterministic window based on the arbitration weight.

11. The method of claim 10, wherein the error rate is predicted based on an amount of data associated with the first data access request.

12. The method of claim 10, wherein the error rate is predicted based on a time associated with servicing the first data access request.

13. The method of claim 10, wherein the error rate is associated with servicing the first data access request to the first data set.

14. The method of claim 10, wherein a second data access request from a second queue is executed during the deterministic window, the second queue selected based on a third arbitration weight.

15. The method of claim 10, wherein the first queue is selected and the first data access request is serviced once the deterministic window is finished.

16. The method of claim 10, wherein the second arbitration weight is updated by an arbitration circuit to a third arbitration weight in response to the deterministic window finishing, the updated third arbitration weight corresponding with the first data access request being executed.

17. The method of claim 10, wherein the prediction circuit predicts the error rate based on logged activity involving the execution of at least a second data access request and a third data access request.

18. A system comprising a non-volatile semiconductor memory organized into a first data set and a second data set, a first queue populated with a first data access request and connected to an arbitration circuit, the arbitration circuit configured to generate a first queue selection sequence in response to a first arbitration weight and a second queue selection sequence in response to a second arbitration weight, the first arbitration weight based on a predicted time to completion for the first data access request, the first arbitration weight prioritizes data access speed over data access execution consistency, the second arbitration weight based on a detected change in the first queue, the second arbitration weight prioritizes data access execution consistency over data access speed to the semiconductor memory, the first queue selection sequence causing the first queue to be skipped during a deterministic window.

19. The system of claim 18, wherein the first queue and arbitration circuit are connected to a network controller, upstream from the non-volatile semiconductor memory.

* * * * *